(12) United States Patent
Faris (10) Patent No.: US 7,162,833 B2
(45) Date of Patent: Jan. 16, 2007

(54) HILLSIDE FARMING MODULE AND SYSTEM

(76) Inventor: Sadeg M. Faris, 24 Pocantico River Rd., Pleasantville, NY (US) 10570

( * ) Notice: Subject to any disclaimer, the term of this patent is extended or adjusted under 35 U.S.C. 154(b) by 0 days.

(21) Appl. No.: 10/962,980

(22) Filed: Oct. 12, 2004

(65) Prior Publication Data

US 2005/0105970 A1    May 19, 2005

Related U.S. Application Data (60) Provisional application No. 60/510,370, filed on Oct. 10, 2003.

(51) Int. Cl.
  *A01G 29/00*  (2006.01)
(52) U.S. Cl. .................................................. 47/58.1 LS
(58) Field of Classification Search .................... 47/17, 47/20, 21.1, 22.1, 48.5; 126/270; 290/44; 416/132
  See application file for complete search history.

(56) References Cited

U.S. PATENT DOCUMENTS

| | | | | | |
|---|---|---|---|---|---|
| 1,900,193 | A | * | 3/1933 | Nearing | ........................ 47/19.2 |
| 3,373,525 | A | * | 3/1968 | Cavataio | ...................... 47/21.1 |
| 4,015,366 | A | * | 4/1977 | Hall, III | ........................ 47/1.43 |
| 4,172,739 | A | * | 10/1979 | Tassen | .......................... 136/246 |
| 4,440,150 | A | * | 4/1984 | Kaehler | ........................ 126/602 |
| 4,934,404 | A | | 6/1990 | DeStegano | |
| 5,632,823 | A | * | 5/1997 | Sharan | ......................... 136/246 |
| 5,966,868 | A | * | 10/1999 | Cox | .............................. 47/66.6 |
| 6,298,866 | B1 | * | 10/2001 | Molnar, IV | .................... 135/16 |
| 6,363,928 | B1 | * | 4/2002 | Anderson, Jr. | ............... 126/577 |
| 6,436,283 | B1 | | 8/2002 | Duke | |
| 6,616,402 | B1 | * | 9/2003 | Selsam | ......................... 415/3.1 |
| 6,830,058 | B1 | * | 12/2004 | Li | ................................. 135/16 |
| 2003/0102675 | A1 | * | 6/2003 | Noethlichs | ..................... 290/44 |
| 2005/0230980 | A1 | * | 10/2005 | Brunet | ......................... 290/44 |

FOREIGN PATENT DOCUMENTS

| | | |
|---|---|---|
| CH | 296280 A | 2/1954 |
| CH | 691 495 A5 | 7/2001 |
| DE | 9004425 U1 | 6/1990 |
| DE | 9310571 U1 | 8/1994 |

(Continued)

OTHER PUBLICATIONS

PCT Search Report, PCT/US2004/033589.

(Continued)

*Primary Examiner*—Francis T. Palo
(74) *Attorney, Agent, or Firm*—Ralph J. Crispino

(57) ABSTRACT

A network of modules is provided that maximizes agricultural land usage. Each module includes a water collection structure supported above agricultural land. The water collection structure may include a mechanism for distributing photonic energy to plants growing on the agricultural land; and a water distribution system for distributing collected water from said water collection structure to plants growing on the agricultural land and/or the soil in which said plants are planted. Plural modules are networked together with plumbing that serves to both provide water transport to and from the modules and structural support to the network of modules. Such a configuration is particularly useful to increase land usage efficiencies on sloped land.

12 Claims, 12 Drawing Sheets

FOREIGN PATENT DOCUMENTS

| | | |
|---|---|---|
| DE | 19647351 A1 | 6/1998 |
| DE | 19700612 A | 7/1998 |
| DE | 19742247 A1 | 4/1999 |
| EP | 1 469 138 A | 10/2004 |
| GB | 2179834 A | 3/1987 |
| GB | 2273233 A | 6/1994 |
| GB | 2 321 926 A | 8/1998 |
| JP | 2003213734 A | 7/2003 |
| JP | 2003274772 | 9/2003 |

OTHER PUBLICATIONS

PCT Written Opinion, PCT/US2004/033589.
PCT Search Report, PCT/US2004/030054.
PCT Written Opinion, PCT/US2004/030054.

* cited by examiner

Dirty Panel     Wash Cycle     Clean Panel

HILLSIDE FARMING MODULE AND SYSTEM

CROSS-REFERENCE TO RELATED APPLICATIONS

This application claims the benefit under 35 U.S.C. §119 (e) and is a continuation in part of U.S. Provisional Patent Application Ser. No. 60/510,370 filed on Oct. 10, 2003, entitled "Aquaculture Module and System,", which is incorporated by reference herein. Further, this application claims the benefit under 35 U.S.C. §120 as a continuation in part application of U.S. patent application Ser. No. 10/941,296, filed on Sep. 15, 2004 entitled "Agricultural Module and System", which is incorporated by reference herein.

TECHNICAL FIELD

The present invention relates generally to agricultural systems and methods.

BACKGROUND OF THE INVENTION

In general, present agricultural (i.e., producing crops and raising livestock) techniques rely on an inherent dichotomy of land usage. On the one hand, land is required for planting of the crops to be farmed, or situating livestock. On the other hand, land is also used, either locally or at some distance from the crops or livestock, for water storage, e.g., in the form of ponds or reservoirs.

In many geographical locations, it is not possible to conveniently farm in certain areas, particularly hilly regions. Further, on hilly islands, it is even more difficult to farm as compared to hilly regions at inland locations. Water for irrigation is sparse, unless a pond is positioned somewhere on the island for water collection during rainfall.

However, usage of ponds for water collection leads to inherent inefficiencies. For example, unwanted minerals and other impurities collected in the pond (e.g., within the soil, algae, other organisms) are transported along with the water for the plants. Such impurities may attract pests, which in turn must be countered with pesticides. While these impurities may be prevented to some extent with water treatment, there is a clear expense associated therewith.

Further, the act of water transport in and of itself is inefficient, requiring electricity or other energy to pump the water long distances.

Rainwater collection has been done for as long as mankind has existed as a source of drinking water. Today, systems remain commonplace whereby rainwater is collected for home use for environmentally and cost conscious individuals. However, without energy-consuming filtration systems, rooftops run-off water is generally not potable.

Therefore, a need remains in the art for improved agricultural systems and methods, particularly for improved land and rainwater usage efficiency.

SUMMARY OF THE INVENTION

Accordingly, the herein described systems and methods provide solutions to overcome the inefficiencies of conventional farming techniques. This is accomplished with a module for collecting water above plant growth thereby maximizing land usage, particularly on hillsides. Thus, an object of the invention is to provide a network of such modules positioned and configured to facilitate hillside farming. Still a further embodiment is to provide a network of such modules positioned and configured to facilitate hillside farming on hilly island terrain.

In one embodiment of the present invention, a module is provided that carries out the above object of the invention including: a water collection structure supported above agricultural land. The water collection structure may include a mechanism for distributing photonic energy to plants and/or livestock growing or grazing on the agricultural land; and a water distribution system for distributing collected water from said water collection structure to plants growing on the agricultural land and/or the soil in which said plants are planted.

The mechanism for distributing photonic energy may comprise a mechanical device for displacing the water collection structure to allow natural sunlight to provide photonic energy to plants growing on the agricultural land.

The mechanism for distributing photonic energy may alternatively, or in combination with the above displacement mechanism, comprise: one or more photovoltaic cells supported on the water collection structure, a secondary battery for storing energy collected from the one or more photovoltaic cells, and one or more light sources to provide photonic energy to plants growing on the agricultural land.

In still further embodiments of the present invention, where a solar energy collection sub system is provided on the module, water collection may be accomplished. This may be in the form of channels, e.g., between and/or around certain photovoltaic cells in an array of such cells. In another example, perforations may be included between and/or around cells to collect water (i.e., rainwater).

The above systems may be included with suitable structures and plumbing to direct water to localized collection tanks or storage area for each module, or a networked collection tank or storage area plumbed to plural modules.

In a preferred embodiment of the present invention, plural modules are networked together with water distribution plumbing. N×M modules are interconnected to a grid of interconnected pipes. On flat terrain, the grid of pipes are generally on a horizontal grid, and form structural support for the plural modules. The weight of the collective modules are supported and maintained in position by the network of pipes. On sloped terrain, this structural and water distribution grid may serve to support the network of modules. Further, to collect water, particularly on sloped terrain, water that flows from each module through the grid is gravity fed to a reservoir. Where the sloped terrain is adjacent to a body of water (e.g., in the case of a hilly island), water may be collected in a reservoir or tank situated beneath the body of water or floating on the body of water.

The solar energy collection sub-system and water collection sub-system are supported on a structure that is configured and dimensioned over the agricultural land. This support structure may include plumbing to distribute collected rainwater and/or conduits housing electrical wiring from the photovoltaic cell(s) to the energy storage sub-system. The support structure may also include conduits for housing wires for other integrated controls and devices, such as wiring from the energy storage sub-system to light systems, control signal wiring from controller system to light system, data signals to collect data from the module, motion control signals, and any other necessary or desired control or device.

In one embodiment, a module is provided having a holding region integrated within the structure mounted atop a pedestal or support. The holding region includes one or more apertures at a vertical level to define a maximum water height within the holding region.

Water may be provided in the holding region by rainwater collection, from a separate holding tank associated with the module, and/or from one or more holding tanks associated with plural modules. The holding region may be separated from the holding tank(s) by suitable valves and plumbing.

Water may be distributed from the holding region to the plants on the agricultural land. Further, water from the holding region may be used for a flush cycle, in order to clean any solar panels on the module from debris, droppings, etc. Still further, water from the holding region may be distributed to one or more holding tanks for future usage.

In still further embodiments of the present invention, a flush or washing cycle may be used on the module. As described above, water from the flush cycle may originate from the holding regions associated with the module, or from reservoirs or tanks. Further, optional solvents may be used in conjunction with flush cycle water. In particular, such cycles are desirable in modules having photovoltaic cells thereon. The flush cycle may be employed to eliminate contaminants from the photovoltaic cells that may block the efficient collection of solar energy. For example, such contaminants may include pollen, debris, droppings, acid rain residue, etc.

A module may also serve to provide structural and system support to one or more integrated windmills, as are commonly used on farms.

DETAILED DESCRIPTION OF THE INVENTION

Herein disclosed is a system and method for agricultural production (i.e., farming), whereby inefficiencies of conventional farming techniques are overcome according to the above objects of the invention. Further, the present system provides an integrated module that harvests water and facilitates harvesting of agricultural products, and optionally harvests electricity from solar energy, wind energy, or both wind and solar energy.

Figure 1:
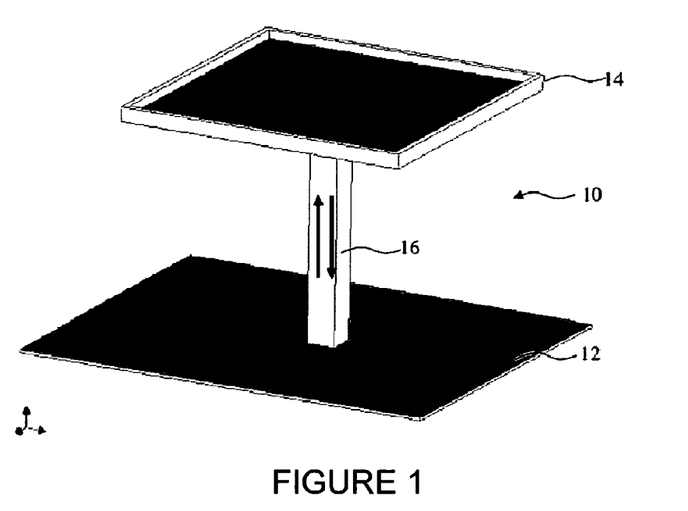
FIG. 1 shows a harvesting module on agricultural land that integrates water collection and agricultural land protection.

In one embodiment of the present invention, and referring now to FIG. 1, a harvesting module 10 is provided that is generally provided on agricultural land 12 that integrates water collection and agricultural land protection. The module 10 includes a water collection structure 14 supported above agricultural land 12. The water collection structure 14 is supported on a pedestal 16, to be described in more detail further herein. Although a single pedestal is shown in FIG. 1, it will be appreciated that plural pedestals or legs may be provided for additional support or other functionality. Further, the pedestal or legs may be used to support other auxiliary agricultural, water collection and distribution, or photonic energy collection and distribution sub-systems.

The module 10 generally includes a mechanism for distributing photonic energy to plants growing on the agricultural land 12. Further, the module 10 includes a water distribution system for distributing collected water from said water collection structure 14 to plants growing on the agricultural land 12 and/or the soil in which said plants are planted. Alternatively, water may be stored and used for irrigation or another purpose, such as for human consumption, commercial use, or industrial applications. A key benefit to the system is controlled irrigation to plants using collected rainwater, while avoiding the problems associated with heavy rains washing away and stripping agricultural land.

In certain embodiments, the water collection structure 14 generally includes a mechanism for releasing water collected therein, i.e., to water the plants thereunder. In other embodiments, the pedestal 16 supporting the water collection structure 14 generally includes suitable plumbing to divert water from the water collection structure 14 to a suitable storage sub-system (not shown in FIG. 1). In further embodiments, suitable plumbing is included in the pedestal 16 to direct water from a water supply or a suitable storage sub-system to the water collection structure 14 for watering of the plants. A system integrating a combination of the water releasing mechanism, water diversion plumbing (from the module) and water direction plumbing (to the module) is preferred in certain environments.

Figure 2A:
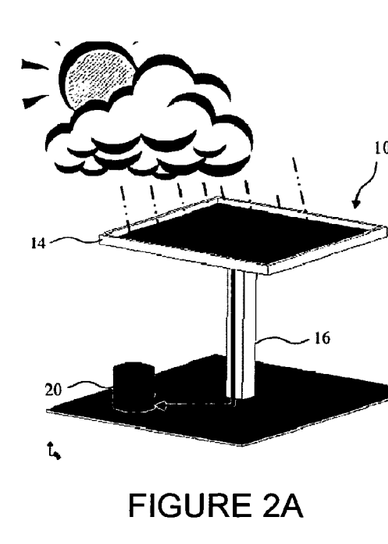
FIGS. 2A and 2B depict general operation of one embodiment of a harvesting module.
Figure 2B:
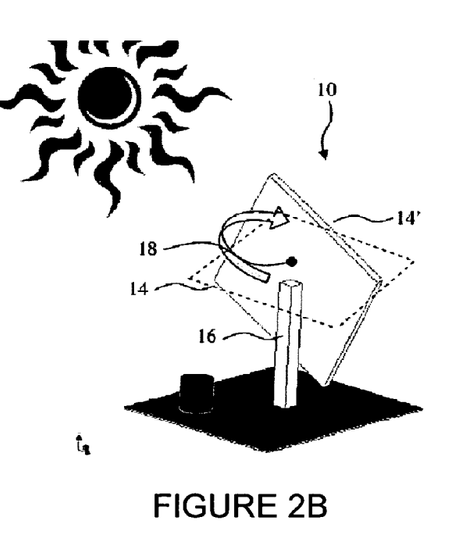

Referring now to FIGS. 2A and 2B, general operation of a harvesting module 10 is depicted, wherein the module includes a mechanical sub-system for displacing the water collection structure 14 thereby allowing ambient photonic energy to fall upon the crops. As shown in FIG. 2A, the water (i.e., rainwater) is collected in the water collection structure 14 during rainfall. As generally described above, the water collected may be directly released to the plants thereunder through suitable apertures, shower heads, etc. Further, watering lines may be in fluid communication with the water collection structure 14, e.g., that are directed proximate the roots or other "thirsty" parts of the plant, consistent with well known irrigation conservation principles.

Additionally, water collected in the water collection structure 14 may be directed to a suitable water collection structure such as a tank 20. Although tank 20 is shown as a separate unit, it may be integrated within the pedestal, for example. Alternatively, instead of a tank 20, collected water may be diverted to a pond or reservoir, e.g., incorporated within an existing municipal, private or local reservoir. Further, for additional conservation of space, the water tank may be positioned underground. In still further embodiments, the water collection structures 14 of several separate modules 10 may be networked to a common tank or storage area (e.g., pond, reservoir, etc.) 20. In certain embodiments, the tank 20 (either associated with one or plural water collection structures 14) may be positioned above ground.

Referring now to FIG. 2B, the module 10 is shown with the water collection structure 14' shown in a displaced or tilted position, allowing ambient sunlight to be directed to the plants. The module 10 includes the pedestal 16, having a suitable mechanical structure to allow such displacement or tilting of the water collection structure 14', as is indicated by a "shadow" of the water collection structure 14 and the directional arrow pointing to water collection structure 14'. The mechanical structure may include suitable motors, actuators, plungers, or other devices to tilt the water collection structure.

To control the motion of the water collection structure 14, suitable light tracking sensors may be integrated in the module. The control may include control of when to displace or tilt the water collection structure 14 (time of motion), what direction to displace or tilt the water collection structure 14 (direction of motion), to what degree to displace or tilt the water collection structure 14 (degree of motion), and/or how long the water collection structure 14 should remain the displaced or tilted position (light period).

Alternatively, or in conjunction with light tracking sensors, the module 10 may be networked to a suitable information source, such as via the Internet or to a dedicated weather information network, to obtain local weather reports. Based on this information, time of motion, direction of motion, degree of motion and/or light period may be determined.

Figure 3A:
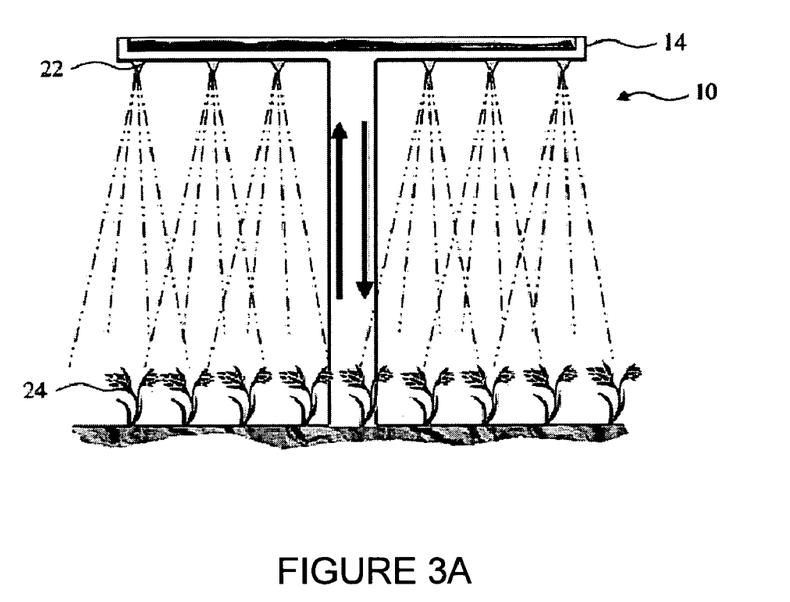
FIGS. 3A and 3B depict embodiments of harvesting modules including watering sub-systems integrated therein.

Referring now to FIG. 3B a harvesting module 10 including a watering sub-system is shown during plant watering mode. This mode may be initiated by preprogrammed timers, moisture sensors proximate plants, or user activated controls, for example. The water collection structure 14 is filled or partially filled with water (e.g., from rainwater, a water supply, previously collected water, or a combination thereof). When watering commences, apertures or shower heads 22 are configured (e.g., through suitable valves) in fluid communication with the water in the collection structure 14, so as to allow water to shower upon the plants 24. Alternatively, or in combination, water may be supplied to the apertures or shower heads 22 from a tank 20 as described with respect to FIG. 2A.

Figure 3B:
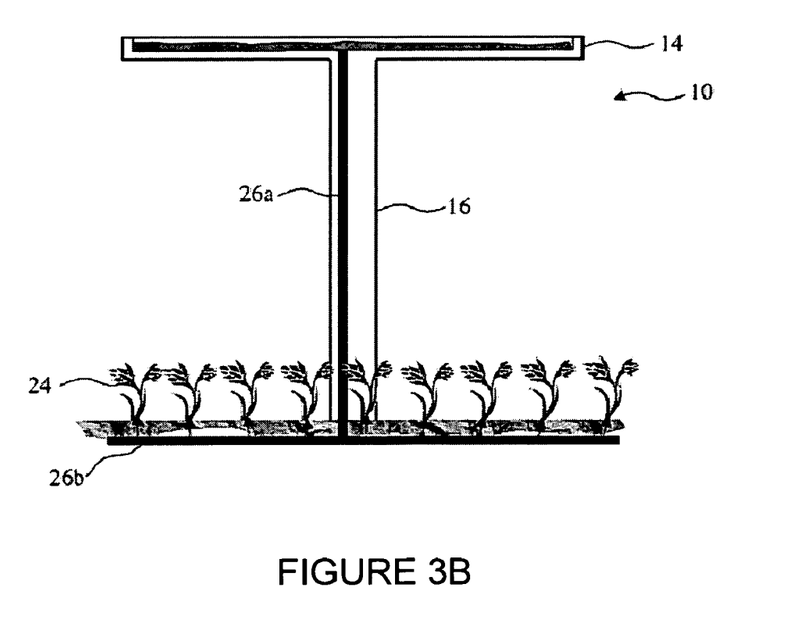

Referring now to FIG. 3B, a harvesting module 10 including an integrated ground or below-ground irrigation subsystem is shown. As with the embodiment of FIG. 3A, watering mode may be initiated by preprogrammed timers, moisture sensors proximate plants, or user activated controls, for example. The water collection structure 14 is filled or partially filled with water (e.g., from rainwater, a water supply, previously collected water, or a combination thereof). When watering commences, water is directed through plumbing 26a, e.g., within or upon the pedestal 16. Water is diverted to water lines 26b, e.g., configured between rows of plants 24, or in another suitable configuration, to direct water, e.g., to the base of the plants. Alternatively, water may be diverted through water lines 26b from another source, e.g., a tank associated with one or more collection structures or another water source.

In still further embodiments, plant watering may be facilitated by a combination of mechanisms, e.g., combining those described in FIG. 3A with those of FIG. 3B. Still further, a mechanical sub-system for displacing the water collection structure 14 may be programmed or activated to displace during certain periods of rainfall to allow for irrigation therefrom.

Figure 4:
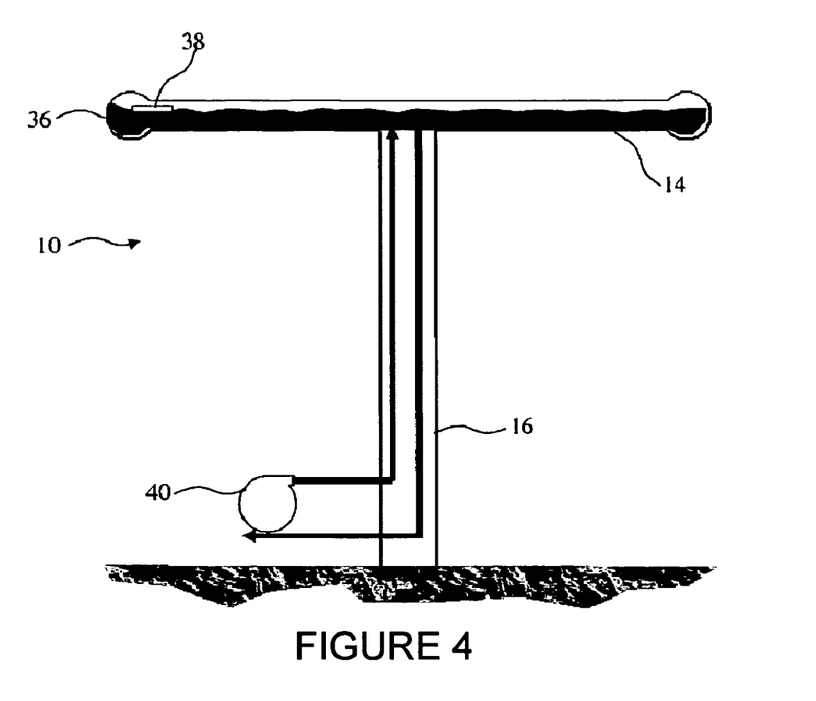
FIG. 4 depicts an embodiment of a water collection structure configured to contain and distribute specified quantities of water.

Referring now to FIG. 4, one embodiment of a water collection structure configured to contain and distribute specified quantities of water is shown. A module 10 including a water collection structure 14 and a pedestal 16 is provided. For example, the water collection structure 14 may include outer edge metering structures 36 (which may be one structure around all or part of the circumference, or plural structures). Water may be directed into the collection structure 14 via rainfall, or from a source via, e.g., a local pump 40. When the water level within the collection structure 14 reaches a certain level, e.g., determined by apertures 38 in the metering structure(s) 36, an automatic cut-off switch may be provided to prevent further filling via pump 40. The metered water in the collection structure 14 may be used to water the plants, e.g., with an automatic switch that activates when the collection structure is filled. Thus, a pre-designated number of plants may be watered with a known quantity of water with the metering structure incorporated in the module of FIG. 4.

The above systems may be included with suitable structures and plumbing to direct water to localized collection tanks or storage area at each level or for each module, or a networked collection tank or storage area plumbed to plural modules.

Figure 5A:
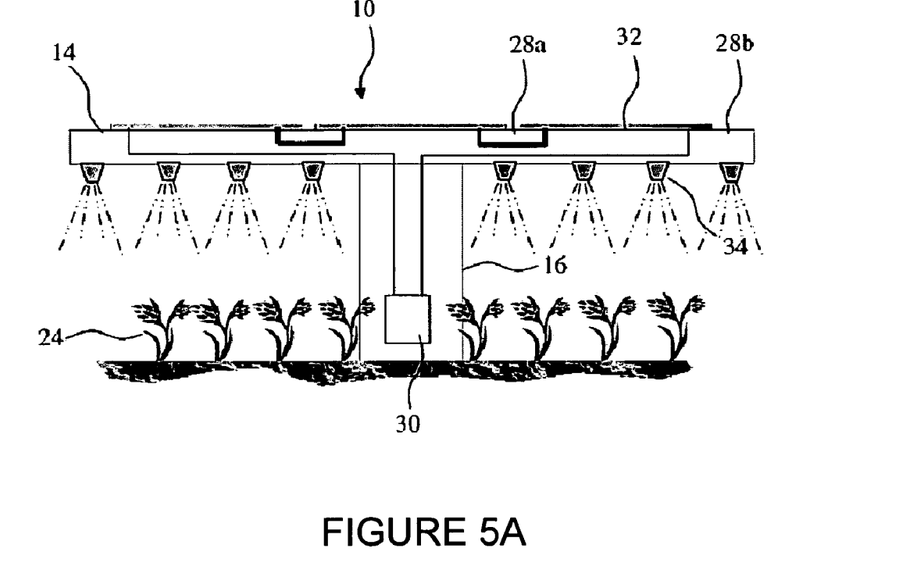
FIGS. 5A–5C depict harvesting modules including water collection structures having solar energy collection sub system integrated therewith.
Figure 5B:
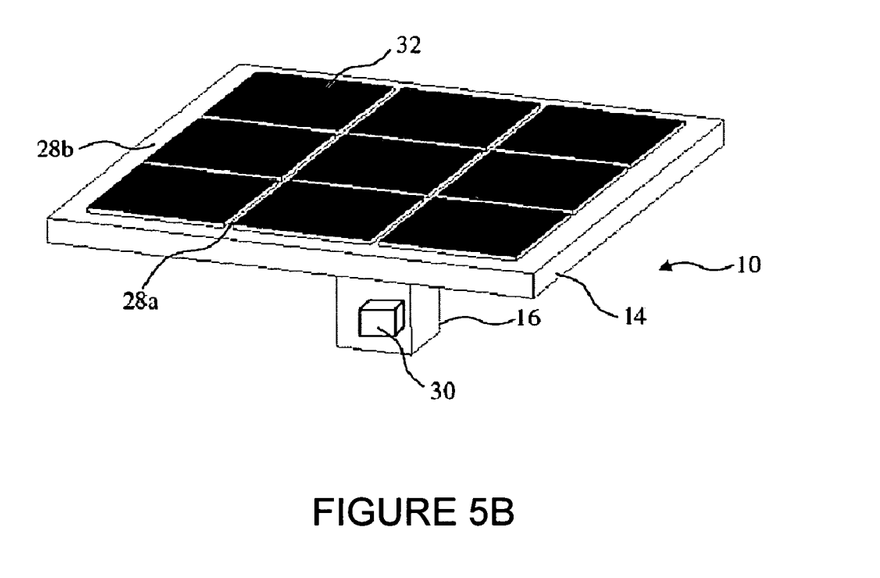

In still further embodiments of the present invention, and referring now to FIGS. 5A and 5B, water collection is undertaken in conjunction with a solar energy collection sub system is provided on the module. The module 10 including water collection structure 14 further includes photovoltaic cells 32 on the structure 14. As is generally shown, energy collected from the cells 32 may be stored by a secondary battery system 30, or another type of electrical energy conversion system. Water (i.e., rainwater) is collected from the structure with channels 28a between the cells 32, and at the periphery of the cells 32 with a suitable channel 28b. Other types of electrical energy conversion systems include, for example, direct conversion of metal oxide into metal, which may be used in fuel cell battery systems, for example, described in U.S. Pat. Nos. 6,569,555, 6,558,829, 6,544,678, 6,383,673, 6,309,771, 6,296,960, and 6,239,508, all of which are incorporated by reference herein. Further, the electrical energy collected from the photovoltaic cells 32 may be distributed directly to a municipal, commercial or private electrical grid and/or sub-station.

Figure 5C:
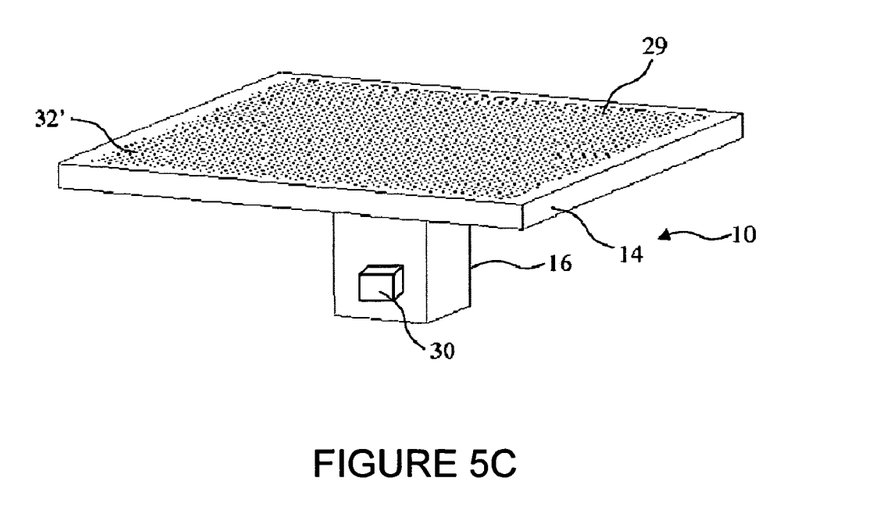

In another example, and referring now to FIG. 5C, perforations 29 may be included between and/or around one or more cells 32' to collect water.

To maximize solar energy collection, sun tracking systems or apparatus may be incorporated in the harvesting module including solar panels. Accordingly, the solar panels, or the entire water collection structure including solar panels integrated therewith, may be rotated to obtain maximum sun exposure. The sun tracking movement may occur as frequently as plural times daily or as infrequently as once per year, for example.

As is shown particularly in FIG. 5A, energy stored in the battery or battery system 30, or electricity from another source, may be used to power lights 34. In preferred embodiments, lights 34 comprise light emitting diodes or other high efficiency light source. These lights may be illuminated to provide photonic energy (e.g., for photosynthesis or animal growth) to the crops and/or livestock on the ground therebelow.

The solar energy collection sub-system and water collection sub-system are supported on a structure that is configured and dimensioned over the agricultural land. This support structure may include plumbing to distribute collected rainwater and/or conduits housing electrical wiring from the photovoltaic cell(s) to the energy storage sub-system. The support structure may also include conduits for housing wires for other integrated controls and devices, such as wiring from the energy storage sub-system to light systems, control signal wiring from controller system to light system, data signals to collect data from the module, motion control signals, and any other necessary or desired control or device.

Water may be provided in the holding region by rainwater collection, from a separate holding tank associated with the module, and/or from one or more holding tanks associated with plural modules. The holding region may be separated from the holding tank(s) by suitable valves and plumbing.

Figure 6:
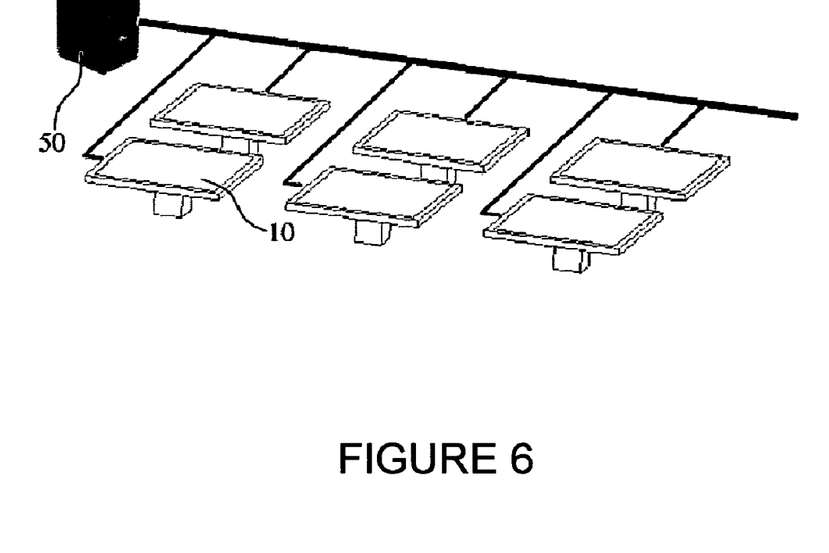
FIG. 6 shows a network of harvesting modules.

A controller 50 may be provided with any of the above modules 10, or in conjunction with a plurality of modules 10, as shown in FIG. 6. The controller 50 may integrate feature including, but not limited to, sun tracking, water level sensors, integration with weather reports, plant health date, energy collection date, energy storage data, battery health, light modulation, and other suitable controller functions. A plurality of sub-controllers may be associated with each module, and networked together, for optimal data collection and system control.

Figure 7:
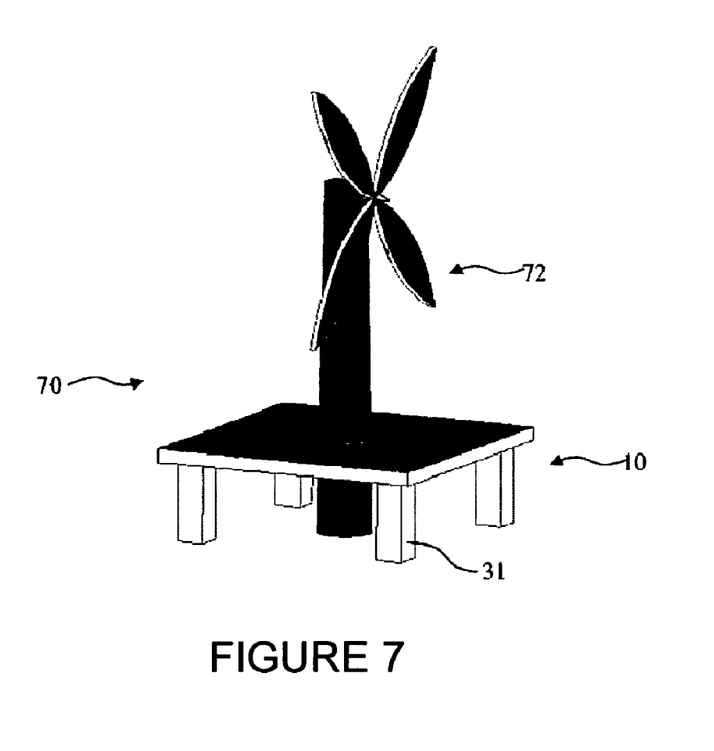
FIGS. 7 and 8 depict havesting modules integrating water collection, wind energy collection and optionally solar energy collection.

Referring now to FIG. 7, a farming system 70 may be provided, integrating water harvesting, wind harvesting, and optionally solar harvesting. The farming system 70 generally includes a module 10 having legs 31 for structural support, and for housing or supporting pipes, wires, etc. Further, a windmill 72 is provided, shown as centrally disposed in the module 10. Note that the module 10 includes the water support structures and optional solar panels and/or sun tracking systems as described above. Accordingly, land utilization may be improved, using the same footprint of land for agricultural farming, water collection and wind energy collection, and in some embodiments solar energy collection.

Figure 8:
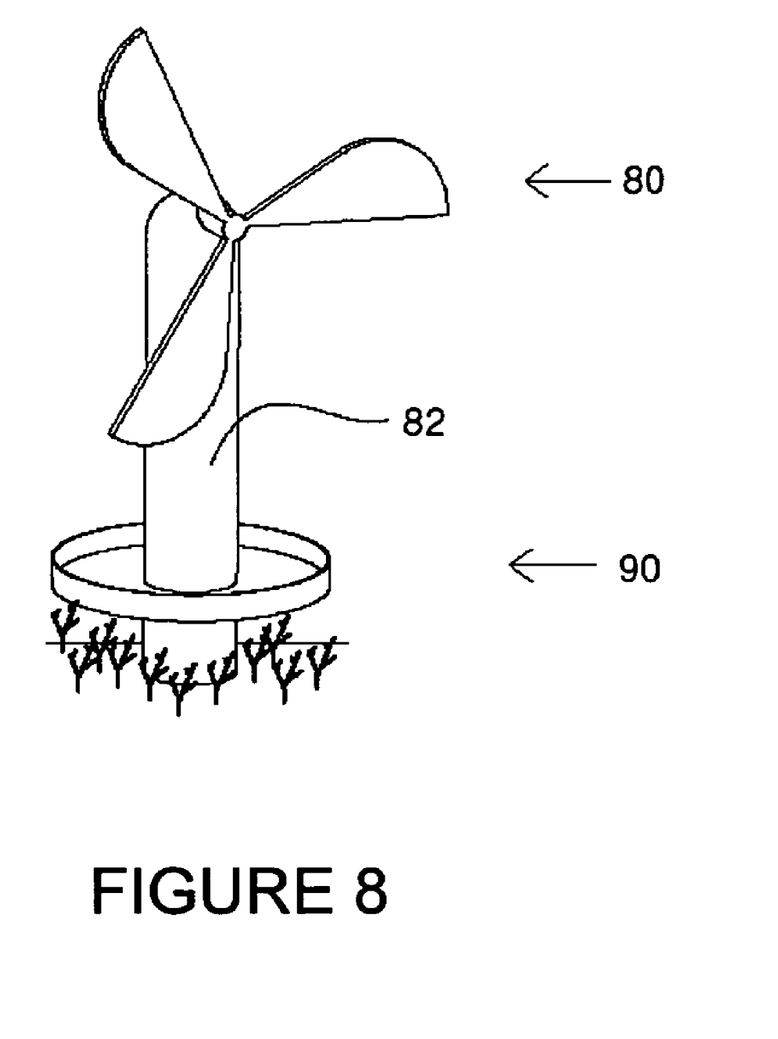

Referring now to FIG. 8, another embodiment of a system of the present invention integrating wind energy collection is shown. A system 80 generally includes a windmill structure 84 supported on a post 82. The post 82 also serves to support, in the depicted example, an annularly configured water collection structure 90. Further, the post 82 may house or support pipes, wires, etc.

Note that in the systems described with respect to FIGS. 7 and 8, solar panels may be integrated with the water collection structure as described above, or alternatively integrated on the support structure for the windmill.

Figure 9:
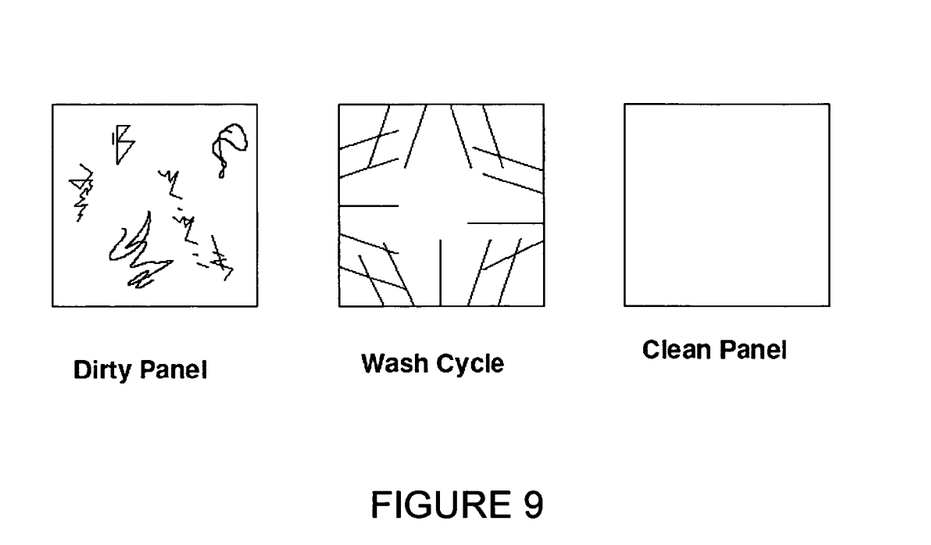
FIG. 9 depicts operation of a wash cycle for cleaning the harvesting module, particularly solar panels integrated within a harvesting module.

In various embodiments of the present invention, a flush or washing cycle may be used within the harvesting module. Water from the flush cycle may originate from the holding regions associated with the module, or from reservoirs or tanks. Further, optional solvents may be used in conjunction with flush cycle water. In particular, such cycles are desirable in modules having photovoltaic cells thereon. The flush cycle may be employed to eliminate contaminants from the photovoltaic cells that may block the efficient collection of solar energy. For example, such contaminants may include pollen, debris, droppings, acid rain residue, etc. Operation of the wash cycle is generally shown in FIG. 9.

In addition to the wash cycle, a wiping cycle may also be incorporated to clean the surface. In certain embodiments, the panel are very large, e.g., meters across. This wiping cycle may use power from the battery or cell. Periodically, e.g., each morning, the system may wash, e.g., as shown above with respect to FIG. 9, and subsequently wipe the panels with suitable wiper structures, examples of which are described herein. Thus, by maintaining the cleanliness of the panels, solar energy collection efficiency is increased. In systems that are not cleaned, over periods of no rainfall, dust, pollen, etc. all build up and decrease efficiency.

Figure 10:
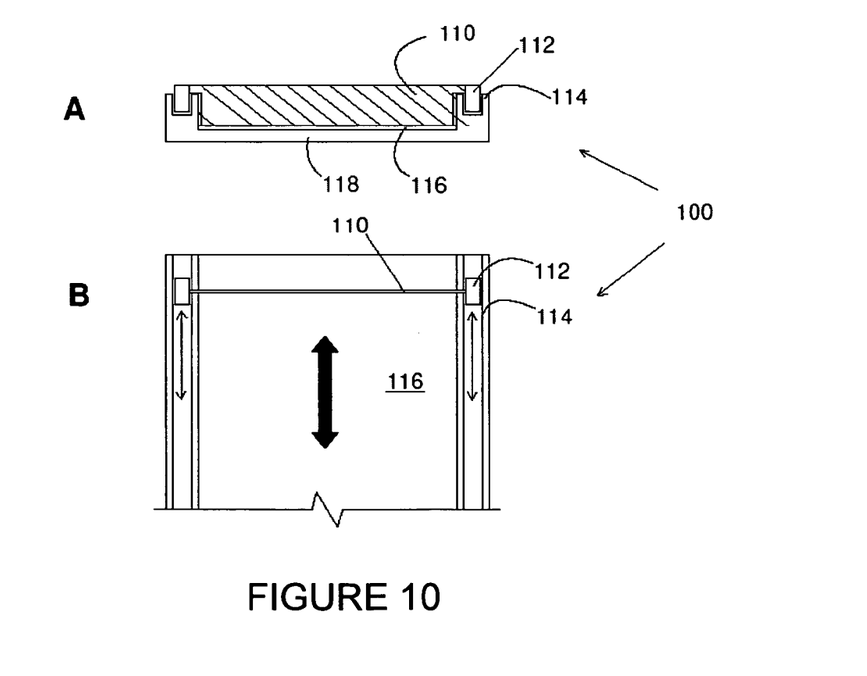
FIGS. 10 and 11 depict wiper structures for cleaning the harvesting module, particularly solar panels integrated within a harvesting module.

For example, one wiper structure for a farming module 100 (having any or all of the features heretofore described) is shown with respect to FIGS. 10A and 10B. FIG. 10A shows a sectional view, and FIG. 10B shows a top plan view of the system 100. The module 100 generally includes a supporting based 118 and a solar panel 116 on the base 118. A wiper structure 110 is provided, having, e.g., gliders or wheels 112 configured, dimensioned and positioned to traverse channels 114 of the module 100. Suitable motors, actuators, or the like, which may be under the control of a suitable controller or network, as described herein, are employed to allow the wiper 110 to traverse and wipe the solar panel 116 when needed, or periodically.

Figure 11:
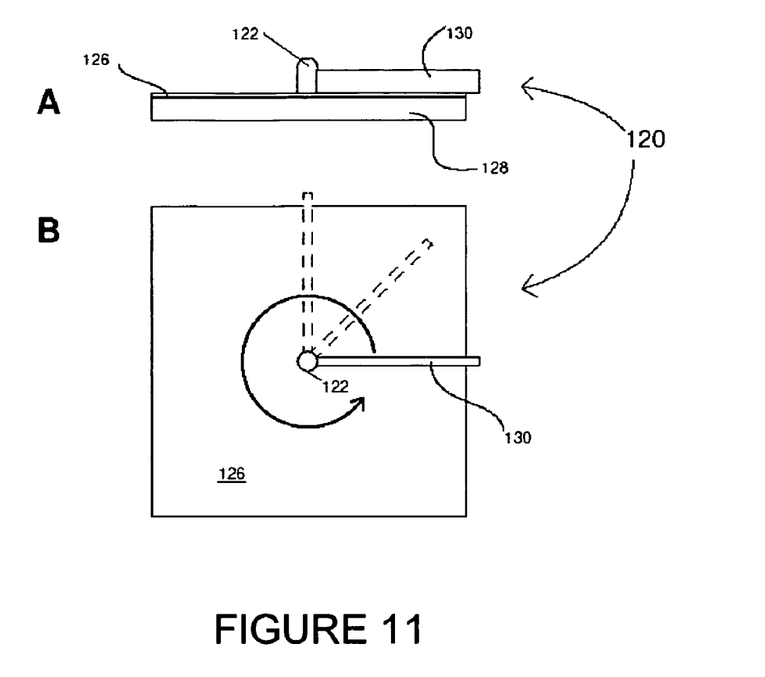

Referring now to FIG. 11, an embodiment of a radial wiper structure is shown incorporated iii a farming module 120. Module 120 includes a solar panel 126 generally supported on a based 128 of the module 120. The wiper 130 is rotated by action of a motor 122, suitable controlled as described herein.

In addition to the active wipers, the solar panel, or a transparent cover to the solar panel, may incorporated self cleaning features, including but not limited to hydrophobicity, sonic wave systems, suitable electrical charge systems, or other suitable systems.

The power storage and distribution system may also vary in the present systems of the invention. For example, the energy storage (i.e., battery) may be based on modular batteries (e.g., one for each module), or batteries coupled to several modules of the present invention. Further, the power distribution sub-systems (e.g., to control lights, pumps, and other energy consuming sub-systems) may include DC-AC inverters, or the lights may be based on DC voltage. Alternatively, power may be collected in phase, allowing AC power transmission with suitable step-up transformer, as is well known in the art.

Figure 12:
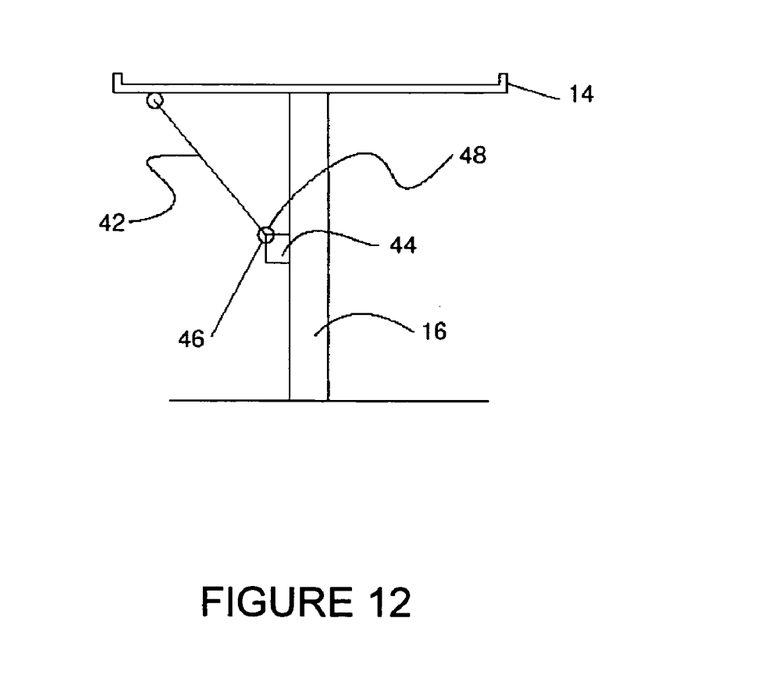
FIGS. 12 and 13 depict operation of one embodiment of a mechanical sub-system for displacing a water collection structure relative a support for a harvesting module.
Figure 13:
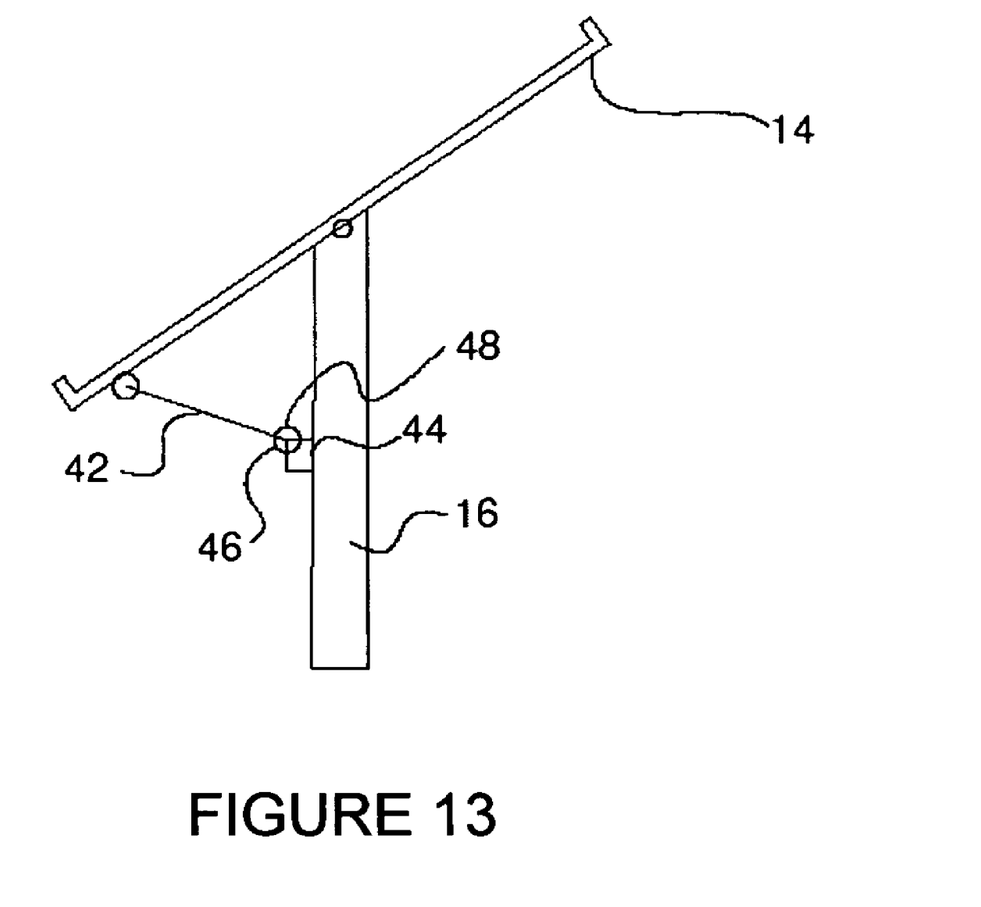

In a further embodiment, referring to FIG. 12, there is shown the water collection structure 14 of the invention placed on a hinge mechanism supported on the pedestal or column 16. In one embodiment, a hinge mechanism includes a cable 42 pivotally coupled to the water collection structure 14 and to the pedestal 16. The cable may comprise of steel wire, steel chain, or any other suitable rigid material which may be able to support the weight of the water collection structure 14. The placement of the cable may also vary along the plane of the underside of the water collection structure or along the pedestal so as to provide the proper support for the water collection structure. In a preferred embodiment, the coupling point of the cable to the pedestal includes a small motor 44 which controls a pivot point 46 with the cable. The motor is mechanically adopted for the rotation at the pivot point so that the water collection structure 14 may be rotated about the apex of the pedestal. The rotation of the water collection structure when the water collection structure is rotated to a closed position is illustrated in FIG. 13.

Referring back to FIG. 12, a preferred embodiment additionally includes a sensor 48 adopted to sense the angle of the cable 42 with respect to the pedestal 16. The sensor may be additionally adopted to be aware of the proper positioning of the water collection structure (for example, if the water collection is in a closed state (i.e. water collection structure suitably retracted and roughly parallel to the pedestal) or is in an open state (i.e. water collection structure suitably open and roughly perpendicular to the pedestal).

In a preferred embodiment, one or more sensors among a plurality of water collection structures 14 of the invention are networked. The network (not shown) may include wireless sensors and wireless actuators coupled wirelessly to a central server. In an alternative embodiment, the sensors may be hard wired to a network to a suitable central server.

Figure 14:
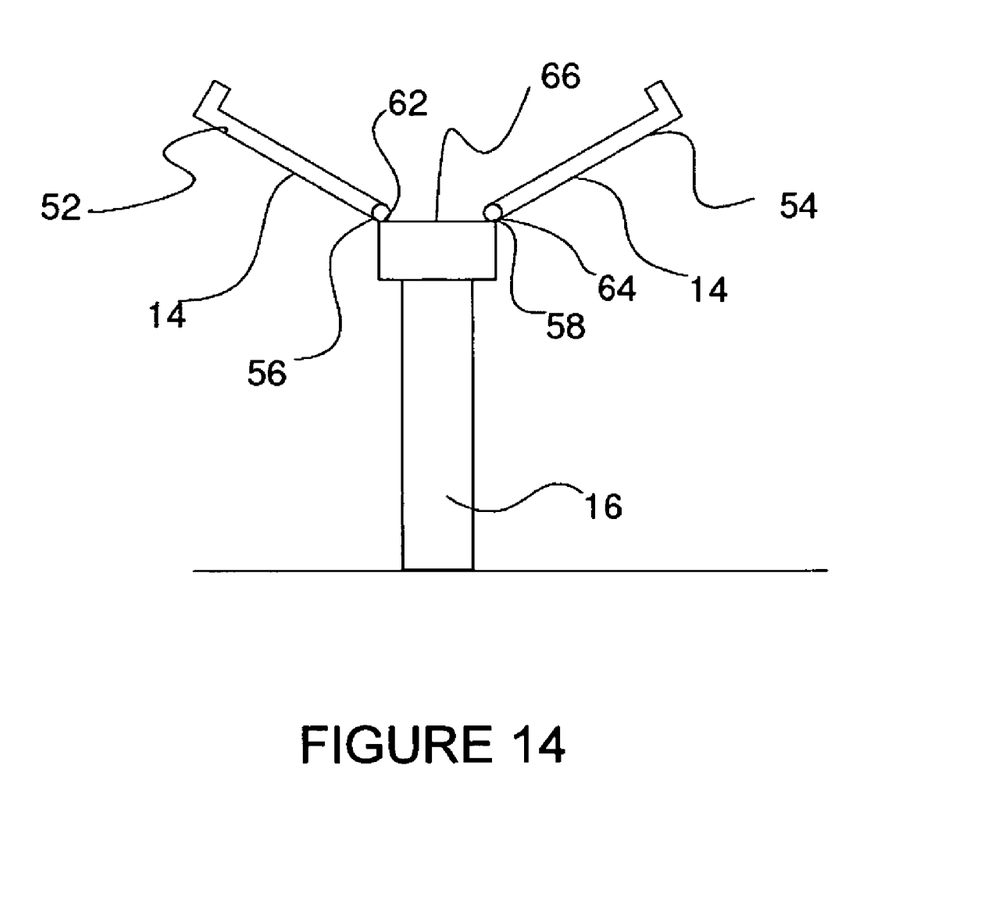
FIG. 14 depicts another embodiment of a mechanical sub-system for displacing a water collection structure relative a support for a harvesting module.

Referring to FIG. 14, there is shown an alternative embodiment of the invention. The water collection structure 14 is divided into two sections 52 and 54 each independently pivotable about the pivot points 56 and 58. In a preferred embodiment, the pivot points 56 and 58 may include a motor 66 as disclosed in the previous embodiment. Importantly, the individual motors 66 may be independently actuatable for rotation along a perpendicular plane to the water collection structure so that the section of the water collection structures may be placed in an open state and a closed state. In a preferred embodiment, sensors 62 and 64 may additionally be included at the pivot point. These sensors may be networked as previously discussed.

Figure 15:
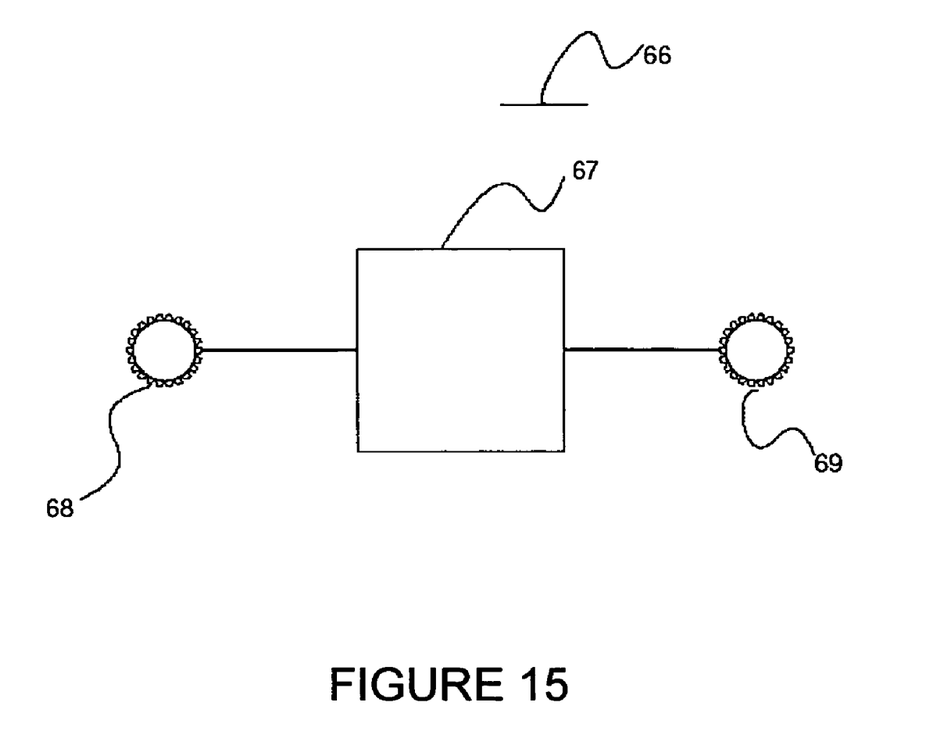
FIG. 15 depicts a motor configuration for the mechanical sub-system of FIG. 14.

Referring to FIG. 15, there is shown detailed structure of the motor 66 of the invention. In a preferred embodiment, the motor includes a water pump 67 for facilitating water transfer along the pedestal. The motor is mechanically coupled to gears 68 and 69 at the pivot points of the sections of the water collection structure 52 and 54. The gears 68 and 69 are adapted for rotation about the pivot point of the sections of the water collection structure.

Figure 16:
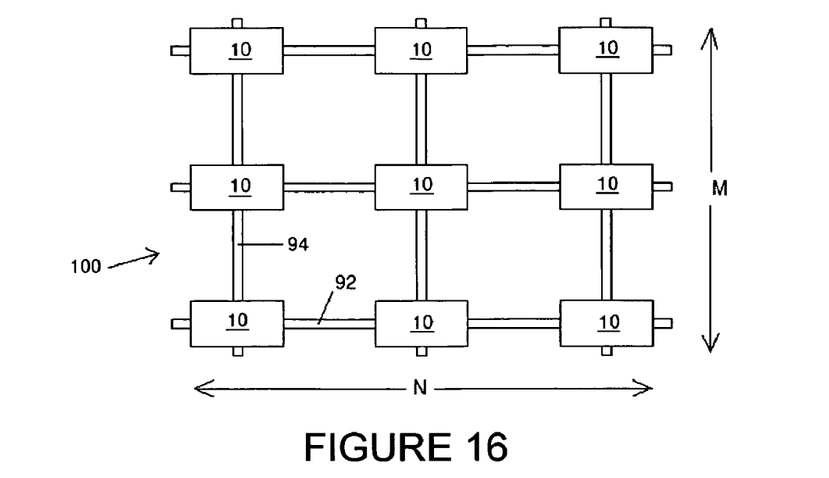
FIG. 16 depicts a network of M xN modules.

Referring now to FIG. 16, one preferred embodiment of the present invention, a network 100 of plural modules 10 are networked together with water distribution plumbing 92, 94. N×M modules 10 are interconnected through a grid of interconnected pipes 92, 94.

Figure 17:
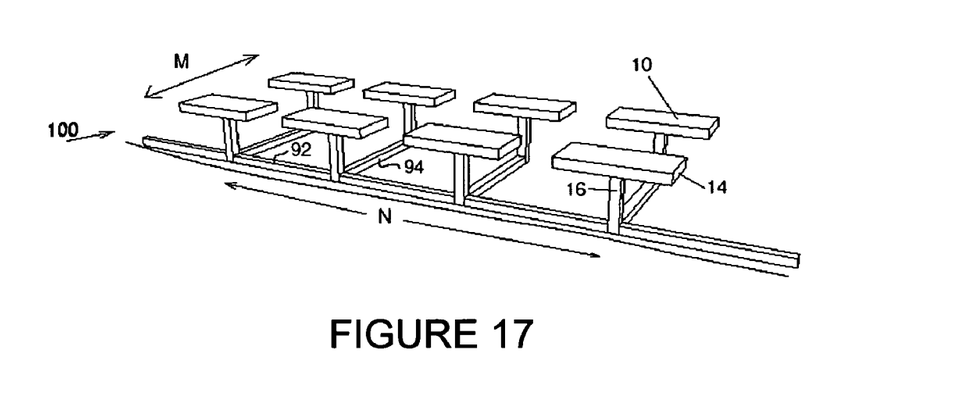
FIG. 17 depicts a grid of pipes providing structure support for harvesting modules.

Referring to FIG. 17, on generally flat terrain, the grid of pipes 92, 94 are generally on a horizontal grid, and form structural support for the plural modules 10. As shown, the pipes 92, 94 are interconnected proximate the base of each pedestal 16 supporting the water collection structure 14. The weight of the collective modules serves to provide support and structural alignment due to the network of pipes 92, 94, which function both as water distribution and structural support.

Figure 18:
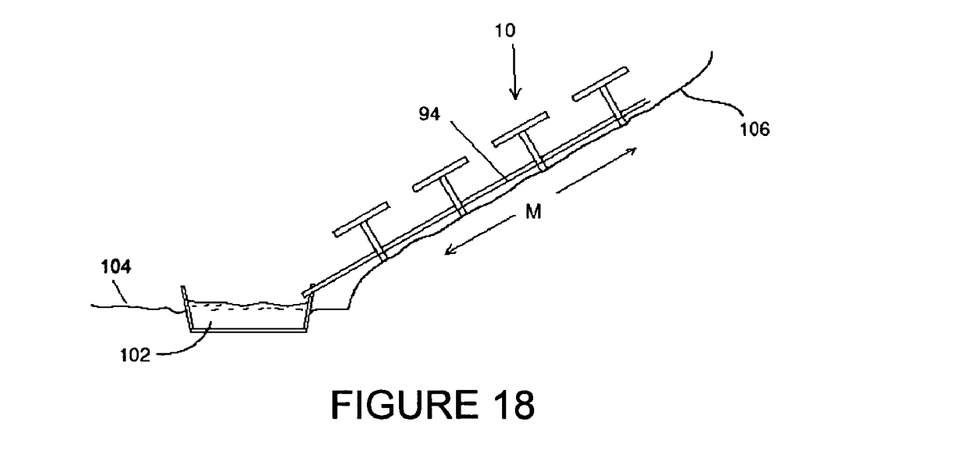
FIG. 18 depicts a grid of pipes providing structure support for harvesting modules on a hillside.

Referring to FIG. 18, on sloped terrain 106, this structural and water distribution grid may serve to support the network of modules, even on the slope. Further, to collect water, particularly on sloped terrain, water that flows from each module 10 through the grid is gravity fed to a reservoir 102. Where the sloped terrain is adjacent to a body of water 102 (e.g., in the case of a hilly island), water may be collected in a reservoir or tank 102 situated beneath the body of water or floating on the body of water.

Note that the dimensions, construction and materials used for the network of pipes 92, 94 must be engineered to maintain the structural loads, including the weight of the modules themselves, the weight of water to be collected by each module, and any other structures (e.g., pumps, controls, plumbing associated with each module 10, etc.).

Thus, as described generally above, a farming module may accomplish many benefits. A particularly preferred embodiment incorporates a single column or pedestal base and a water collection structure with solar collection, water collection, and sun tracking features. The sun tracking feature may be used to optimize energy collection, or alternatively as shown in FIG. 2B. For certain embodiments, the water collection structure is supported about 2–4 meters above the ground. In preferred operation, the system includes a shower cycle to water plants when dry and a flush cycle.

As water is collected directly from rain, there is no soil buildup to extensively pollute the water. Thus, this water may be potable, with only bacteria treatment, and no need for extensive particulate filtration systems.

Further, the space used by the system is minimized, as plants are grown underneath, and water is collected above. In certain embodiments, both water and energy is collected above. This has clear advantages over conventional farming techniques using separate reservoir or pond water storage.

Another key benefit of the present invention is that the module may be partially or completely self-sustaining. Power for the control systems, pumps, motors (e.g., of sun-tracking systems, displacement systems, wiper systems) may be supplied from any integral PC cells, from batteries having energy captured from the PV cells, or from a conventional power grid. However, in preferred embodiments, a substantial amount of the module power is derived from the PV cells and/or batteries.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A network of farming modules, each farming module including a water collection structure supported on one or more legs above agricultural land in a configuration that allows agricultural growth beneath said water collection structure, the network comprising:
   plural farming modules interconnected to one another with a plumbing network,
   wherein the farming modules are at least partially supported and maintained in structural alignment with said plumbing network, and
   wherein at least some of the water collected from each module is distributed through said plumbing network.

2. The network as in claim 1, wherein each module further comprises a mechanism for distributing photonic energy to plants growing on the agricultural land.

3. The network as in claim 2, wherein the mechanism for distributing photonic energy comprises a mechanical device for displacing the water collection structure to allow natural sunlight to provide photonic energy to plants growing on the agricultural land.

4. The network as in claim 2, wherein the mechanism for distributing photonic energy comprises one or more photovoltaic cells supported on the water collection structure, a secondary battery for storing energy collected from the one or more photovoltaic cells, and one or more light sources to provide photonic energy to plants growing on the agricultural land.

5. The network as in claim 4, comprising water collection channels around and/or between photovoltaic cells.

6. The network as in claim 4, comprising water collection perforations between and/or around photovoltaic cells.

7. The network as in claim 3, further comprising sun tracking functionality to determine when to move said water collection structure.

8. The network as in claim 4, further comprising sun tracking functionality to optimize solar energy collection.

9. The network as in claim 1, further comprising a controller to control the network.

10. The network as in claim 1, wherein each module comprises a controller to control the particular module.

11. The network as in claim 1, wherein each module further comprises a windmill structure, whereby a footprint for the module uses land for agricultural farming, water collection and wind energy collection.

12. The network of claim 1, wherein each module further comprises a windmill structure, whereby a footprint for the module uses land for agricultural farming, water collection, wind energy collection and solar energy collection.

* * * * *